Aug. 12, 1924.

W. MULLOY 1,504,368

AUTOMOBILE BRAKE

Filed June 12, 1922

INVENTOR
WILLIAM MULLOY
By Edward E. Longan
ATTY.

Patented Aug. 12, 1924.

1,504,368

UNITED STATES PATENT OFFICE.

WILLIAM MULLOY, OF ST. LOUIS, MISSOURI.

AUTOMOBILE BRAKE.

Application filed June 12, 1922. Serial No. 567,554.

*To all whom it may concern:*

Be it known that I, WILLIAM MULLOY, a citizen of the United States, and resident of the city of St. Louis and State of Missouri, have invented certain new and useful Improvements in Automobile Brakes, of which the following is a specification, containing a full, clear, and exact description, reference being had to the acompanying drawings, forming a part hereof.

My invention relates to improvements in automobile brakes, and has for its primary object a brake having a pneumatic brake shoe.

A further object is to construct a brake having a pneumatic brake shoe in which the brake shoe is so arranged that it can be inflated to any desired degree.

In the drawings.

Figure 1:
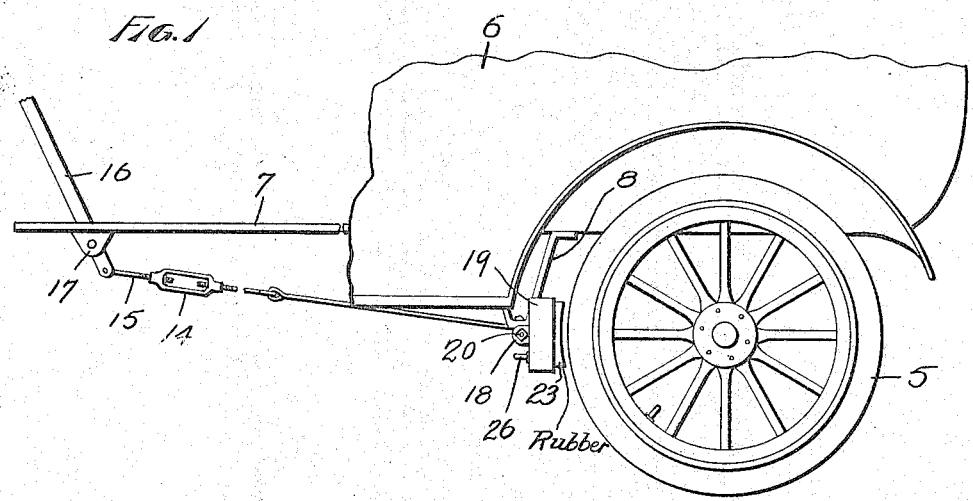
Fig. 1 is a side elevation of an automobile with parts broken away, showing my device installed thereon.
Figure 2:
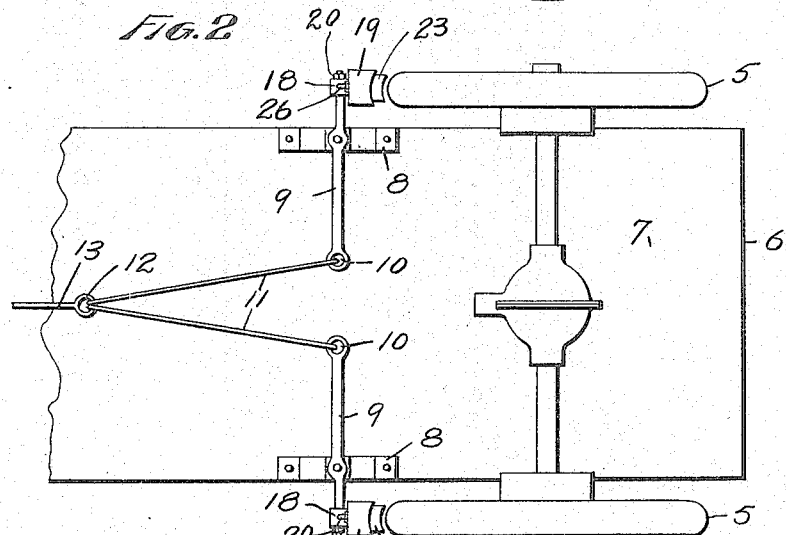
Fig. 2 is a fragmental bottom plan view of the rear end of an automobile.
Figures 3, 4:
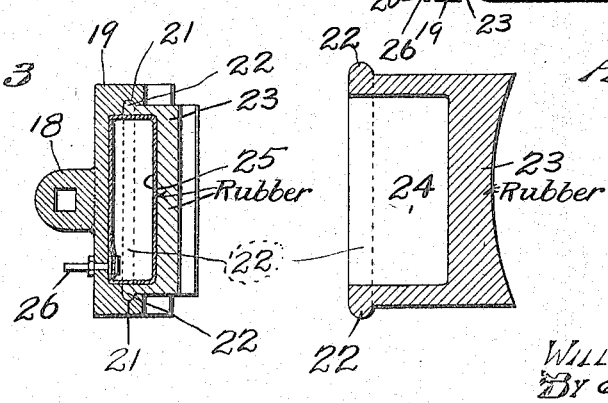
Fig. 3 is an enlarged vertical section through the brake block and brake shoe, showing the manner of securing the shoe to the block.
Fig. 4 is an enlarged horizontal section of the brake shoe.

In the construction of my device I employ an automobile having rear wheels 5 and a body 6. The body 6 is equipped with the usual floor 7. Secured to the underside of the floor and along the outer edges thereof are brackets 8. These brackets are located forward of the rear wheels 5. Pivotally secured to each bracket is a brake beam 9, one end of which is provided with an eye 10, to which brake rods 11 are secured. The free ends of these brake rods are secured in the eye 12 of a brake rod 13,—the free end of which is in turn secured to a turnbuckle 14. Secured in the opposite end of the turnbuckle 14 is a rod 15, which in turn is pivotally secured to a hand lever 16, which lever is mounted in a bracket 17, secured to the underside of the floor 7. The purpose of the turnbuckle is to permit the adjustment of the brakes so that they will not set either too close or too far from the wheels. The opposite end of the brake beam 9 extends through a lug 18, which is formed integral with the brake block 19. That portion of the brake band 9 which extends through the lug 18 is preferably square, so that the brake block will not turn on the brake beam,—the nut 20 securing the brake block on the beam. The brake block is formed hollow and is provided with an undercut recess 21 which receives a bead 22 formed along the inner edge of the brake shoe 23. This brake shoe is preferably constructed of rubber or analogous material and may be reinforced with fabric in the same manner that automobile casings are now reinforced. The brake shoe 23 is provided with a recess 24, which receives an air bag 25. This air brake is constructed similar to a pneumatic tube, and is provided with a valve stem 26, which passes through the brake block 19 for inflating purposes. When the air bag 25 is filled, it forces the bead 22 into the recess 21, and securely holds the brake shoe in position within the block. By using the pneumatic bag 25, the brake shoe 23 can be made more or less resilient, according to the amount of air pressure placed in the bag.

By the use of my device the gradual resilient braking effect is obtained on the outer surface of the wheel, and due to the fact that both the tire and brake shoe are resilient, I obtain a more gradual stop, and one not so liable to bind one wheel, and thus cause skidding as at present where the contacting and expanding brakes are made use of.

Having fully described my invention, what I claim is:

1. An automobile brake comprising in combination with an automobile body, brackets secured to the underside of said body, brake beams pivotally secured to said brackets, brake rods secured to said brake beams, means for operating said brake rods, a brake block carried by the brake beams, and a pneumatic brake shoe and means whereby said brake shoe is secured to the brake block by the inflation of said shoe.

2. An automobile brake comprising in combination with an automobile body having brackets secured to its underside, brake beams pivotally secured to said brackets, and means for operating said brake beams, a brake block carried by the brake beams, said block being hollow and provided with a channel, a rubber brake shoe provided with an outwardly extending bead, said bead adapted to be inserted in the channel, and an air bag provided with a valve stem located within the brake block and brake shoe, said bag when inflated adapted to hold the bead in the recess and prevent the accidental removal of the brake shoe.

In testimony whereof, I have signed my name to this specification.

WILLIAM MULLOY.